United States Patent Office 3,290,369
Patented Dec. 6, 1966

3,290,369
RECOVERY OF ACYCLIC DICARBOXYLIC ACIDS FROM MIXTURES OF THE SAME
John H. Bonfield, East Aurora, N.Y., and Reed H. Belden, Chester, Va., assignors to Allied Chemical Corporation, New York, N.Y., a corporation of New York
No Drawing. Filed Feb. 19, 1962, Ser. No. 174,277
4 Claims. (Cl. 260—537)

This invention relates to an improved process for the separation and recovery of adipic, succinic, and glutaric acids from liquors in which they are present in admixture with one another. More particularly it relates to an improved process for the separation and recovery of pure adipic acid, succinic acid, and glutaric acid from the adipic acid waste stream obtained by the denitrification of an adipic acid mother liquor from a process involving the oxidation of cyclohexanol or cyclohexanone with nitric acid in the presence of a catalyst.

It is well known in the art to produce adipic acid from readily available cyclohexanol. This is for the most part accomplished by the oxidation of cyclohexanol and cyclohexanone with nitric acid in the presence of a metal compound based oxidation catalyst such as the compounds of vanadium, manganese or copper, as well as other heavy metal compounds. This reaction, which is used commercially on a multi-million pound scale, is not clean cut, that is by-products in the form of other acids such as succinic and glutaric are produced in small but significant quantities. The complete separation of pure adipic acid from the crude reaction product is however difficult to accomplish by known means. The methods of the prior art affect a partial separation which leaves a small percentage of adipic acid together with succinic and glutaric acids in the mother liquor. These acids have heretofore been discarded as a waste material since means were not available to recover them in an economic fashion. Since the scale on which adipic acid is manufactured by this type of process is large, the amount of adipic acid discarded in the liquor represents a commercially significant amount as does also the amount of succinic and glutaric acids discarded in this manner.

It is therefore a principal object of this invention to devise an improved process for the separation and recovery of adipic, succinic, and glutaric acids in pure form from liquors containing such acids in admixture therein.

Another object of this invention is to devise an improved process for the separation and recovery of adipic acid from the waste mother liquors obtained in the nitric acid oxidation of cyclohexanol.

A further object is to provide a process for the separation and recovery of succinic acid from mixtures of adipic, succinic, and glutaric acids. A still further object is to devise a process for the separation and recovery of glutaric acid from mixtures of adipic, succinic, and glutaric acids.

It has now been found that these and other objects and the advantages incidental thereto can be attained if liquor containing the mixed acids is distilled under reduced presures in such a manner as to collect two fractions, the first containing substantially all of the succinic acid and a portion of the glutaric and the second containing substantially all of the adipic acid and a portion of the glutaric, recrystallizing the individual fractions from water to isolate pure succinic acid from the first fraction and pure adipic acid from the second and separating glutaric acid from the mother liquors obtained in the recrystallization steps by evaporating the liquors to dryness.

The separation and recovery of these dibasic acids from mixtures thereof in accordance with the method of this invention is made possible by the fact that glutaric acid is more soluble (83 grams/100 grams of water at 20° C.) than succinic acid (6.9 grams/100 grams of water at 20° C.) or adipic acid (1.44 grams/100 grams of water at 20° C.) and that the boiling point of glutaric acid (180° C. at 10 mm. Hg abs.) lies between that of succinic anhydride (130° C. at 10 mm. Hg abs.) and adipic acid (265° C. at 10 mm. Hg abs.).

A preferred manner for carrying out the process of this invention will be described for the treatment of a waste mother liquor obtained in the well known process of oxidation of cyclohexanol with nitric acid in the presence of a copper-vanadium catalyst and containing in addition to adipic, succinic, and glutaric acids various other by-product acids and nitric acid. This mother liquor, to which sulfuric acid or phosphoric acid is preferably added in sufficient quantities to liberate nitric acid from the inorganic nitrates present, is evaporated under reduced pressures, as for example, about 150 mm. Hg abs., until the temperature of the vapors rises to about 100° C. The evaporation is thereafter continued while blowing steam through the mass which is distilled at about 100° C. to 115° C. under a pressure to 150 mm. Hg abs. The distilland undergoes a color change from a deep green to brown and then back to green again. At this point, the denitrification is substantially complete and the residue is discharged to a suitable vessel wherein the mass is agitated and maintained at 90° to 100° C. for 8 to 12 hours while air is blown through the molten mass to remove the last traces of nitric acid. The molten mass can be filtered to remove the catalyst salts and the clarified melt is run into a still. The mass may then be distilled slowly at 100 mm. Hg abs. until the vapor temperature reaches 160° C. while collecting the condensed vapors as the first fraction. The receivers are then changed and the distillation continued collecting as a second fraction the material boiling between 160° and 275° C. The first fraction containing a mixture of succinic anhydride and glutaric acid/anhydride can be recrystallized from water to effect the substantially complete separation of succinic acid from glutaric acid. The second fraction obtained can likewise be recrystallized from water and thusly pure adipic acid can be separated from the more soluble glutaric acid. The recrystallization mother liquors can then be combined and evaporated to dryness and the residue distilled to obtain essentially pure glutaric acid/anhydride, B.P. 145 to 180° C. at 10 mm. Hg abs.

The following example is a more detailed illustration of this invention. Parts are by weight and temperatures are in degrees centigrade.

*Example 1*

An adipic acid mother liquor obtained from a process in which cyclohexanol was oxidized with nitric acid in the presence of a copper-vanadium catalyst and containing in 1000 parts of mother liquor

| | Parts |
|---|---|
| Adipic acid | 250 |
| Succinic acid | 45 |
| Glutaric acid | 135 |
| Nitric acid | 330 | was evaporated in a partial vacuum of 150 mm. Hg abs. until the vapor temperature reached 100°. Water was added to the distilling mass at a rate slightly less than the distillation rate until the temperature rose to 115°. The addition of water was adjusted to maintain the distillate temperature constant at 115°. The residue which was originally deep green in color, turned down and then reverted to its original deep green color. The residue was thereafter cooled to and maintained at 90° to 100° for about 8 to 12 hours. The mass was agitated and a slow current of air was blown through the mass during this period. The completely denitrified dicarboxylic acid mixture was transferred to a high vacuum still and distilled under 10 mm. Hg abs. pressure. Two fractions of distillate were collected. The first boiling up to 160° contained a mixture of succinic anhydride and glutaric acid/anhydride and weighed 247.5 parts.

The first fraction was dissolved in 50 parts of boiling water. To the solution 1 part of Darco, decolorizing charcoal, was added and the mixture sludge filtered. The clarified filtrate war cooled to 10° and the resultant slurry filtered, washed with cold water and dried at 60°. Thusly 40 parts of succinic acid, M.P. 189° C., were obtained.

The second fraction was dissolved in 400 parts of boiling water, treated with 4 parts of Darco and filtered. The clarified filtrate was cooled to 10°, and the adipic acid precipitate was separated by filtration, washed with cold water and dried at 60°. By this means, 180 parts of adipic acid, M.P. 152°, were recovered.

The mother liquors from both recrystallizations were combined and evaporated to dryness. The residue was distilled at 10 mm. Hg abs. The forerunning fraction boiling to 145° was separated and added to a succeeding denitrification step. The portion distilling between 145° to 180° was collected separately and on recrystallization from water yielded glutaric acid, 100 parts, melting at 97°. The residue was discarded.

It can thus be seen that an effective, convenient and economical method has been devised for the separation and recovery of adipic, succinic, and glutaric acids from mixtures thereof. The invention has been illustrated by the above example, but it should be distinctly understood that it is not to be limited to the specific details set out therein.

For example, the vacuum fractionation of the dicarboxylic acid mixture can be carried out over a wide range of pressures. Thus although less than 10 mm. Hg abs. is that preferred since at this pressure the decomposition of adipic acid is held to a convenient minimum, the pressure can be varied from 1 mm. to 50 mm. The temperature at which the mixtures of carboxylic acids distill will, of course, vary with the pressure.

Although certain preferred embodiments of the invention have been disclosed for purpose of illustration, it will be evident that various changes and modifications may be made therein without departing from the scope and spirit of the invention.

We claim:
1. The process for the separation and recovery of succinic, adipic, and glutaric acids from liquors containing them in admixture with one another comprising distilling the mixture under reduced pressure so as to obtain two fractions, the first containing substantially all of the succinic acid and a portion of the glutaric and the second substantially all of the adipic and a portion of the glutaric; recrystallizing the individual fractions from water to isolate pure succinic acid from the first fraction and pure adipic acid from the second fraction; and separating glutaric from the mother liquors obtained in the recrystallization steps by evaporating the mother liquor to dryness.

2. The process of claim 1 in which the mixture of acids is distilled under 10 mm. Hg abs. pressure; the first fraction is collected at temperatures up to 160° C., and the second fraction is collected at temperatures ranging from 160° to 275° C.

3. The process of claim 1 in which the mixture of acids is obtained by denitrifying by means of evaporation the adipic acid mother liquor from a process involving the oxidation of cyclohexanol with nitric acid in the presence of an oxidation catalyst.

4. The process of claim 3 in which the mixture of acids is distilled under 10 m. Hg abs. pressure; the first fraction is collected at temperatures up to 160° C., and the second fraction is collected at temperatures ranging from 160° to 275° C.

References Cited by the Examiner
UNITED STATES PATENTS

| | | | |
|---|---|---|---|
| 2,719,172 | 9/1955 | Nebe et al. | 260—531 |
| 2,831,024 | 4/1958 | Brown et al. | 260—531 |
| 2,971,010 | 2/1961 | Gilby et al. | 260—531 |

OTHER REFERENCES

Cheronis et al.: Semimicro Qual. Org. Analysis, 2d. ed., pp. 35 and 55 (1957).

LORRAINE A. WEINBERGER, *Primary Examiner.*

CHARLES B. PARKER, *Examiner.*

G. P. D'ANGELO, S. B. WILLIAMS,
*Assistant Examiners.*

UNITED STATES PATENT OFFICE
CERTIFICATE OF CORRECTION

Patent No. 3,290,369 December 6, 1966

John H. Bonfield et al.

It is hereby certified that error appears in the above numbered patent requiring correction and that the said Letters Patent should read as corrected below.

Column 4, line 25, for "10 m" read -- 10mm --.

Signed and sealed this 19th day of September 1967.

(SEAL)
Attest:

ERNEST W. SWIDER
Attesting Officer

EDWARD J. BRENNER
Commissioner of Patents